June 11, 1963  W. C. LAMPHIER  3,093,775
SERIES WOUND CAPACITOR
Filed Jan. 22, 1959

*INVENTOR.*
WALTER C. LAMPHIER
BY *Connolly and Hutz*
HIS ATTORNEYS

United States Patent Office 3,093,775
Patented June 11, 1963

3,093,775
SERIES WOUND CAPACITOR
Walter C. Lamphier, Williamstown, Mass., assignor to Sprague Electric Company, North Adams, Mass., a corporation of Massachusetts
Filed Jan. 22, 1959, Ser. No. 788,320
6 Claims. (Cl. 317—260)

This invention relates to a series-wound capacitor, and more particularly to a fully impregnated and void free full-wound series-wound capacitance section.

It is extremely difficult to control corona or arcing between terminals of a capacitor that is subjected to more than 10,000 volts. Hence, it has become customary to split the imposed voltage by utilizing a plurality of capacitor sections that are connected in series. A highly effective and space saving construction that permits the connection of capacitors in series is the so-called series-wound capacitor in which more than a single capacitor may be rolled into the same section by utilizing an electrode that is common to all of the capacitors. The two most widely used series-wound constructions are the so-called split-wound construction that is shown in FIG. 2 of Allison et al. 2,634,315, and the so-called full-wound construction as shown in FIG. 4 of Hetenyi 2,053,334. The full-wound construction has an advantage over the split-wound style for capacitors that must charge and discharge very rapidly, in that the full length windings are capable of carrying higher current than the split windings.

Space considerations require that the plurality of full length windings of a full-wound series-wound capacitor be as close laterally as possible without becoming subject to the very corona condition that is sought to be avoided by the use of the series-wound construction. The close lateral spacing of the full length windings demands that the space between the electrodes be fully impregnated to avoid corona, in that the dielectric breakdown of an air space between electrodes is only about 25 volts per mil, whereas the dielectric breakdown of capacitor grade impregnant oil is about 500 volts per mil.

The usual procedure for attempting to provide this desired full impregnation of a capacitor section is to impregnate the section with dielectric oil under elevated temperature conditions. Although heating the impregnant reduces the viscosity and ensures better penetration of the impregnant into the tightly wound convolute section, there are attendant disadvantages that were not mastered prior to this invention. The contraction of the impregnant that occurs when the section cools is manifested by a reduction in the volume of oil between the electrodes to the extent that voids may occur. That is to say, instead of the full dielectric breakdown strength of the oil impregnant, there may be a plurality of low dielectric pockets or void spots between the laterally disposed electrodes of a series-wound capacitor, with the consequent likelihood of arcing or breakdown at these points.

It is an object of this invention to provide a full-wound series-wound capacitor that is not subject to the deficiencies of prior art constructions.

It is another object of this invention to provide a fully impregnated full-wound series-wound capacitor.

It is a further object of this invention to provide a full-wound series-wound capacitor construction in which the lateral spacing between the active electrodes is less than heretofore possible.

These and further objects of this invention will become more apparent upon consideration of the following description when read in conjunction with the accompanying drawing in which.

In general the objects of this invention are attained, and the inventive concept is illustrated, by a full-wound series-wound capacitor section having a pair of full length laterally spaced juxtaposed electrode foils that are wound in extended-foil fashion in opposition to a common electrode of substantially equal length. In addition to the conventional dielectric spacing material rolled between the common electrode and the extended foil electrodes, the present invention employs a dielectric spacer ribbon between the laterally adjacent edges of the extended foils.

In a more restricted form of this invention, the objects are obtained by a series-wound capacitor section having an elongated common electrode convolutely wound in capacitive relation to a pair of elongated laterally spaced juxtaposed electrodes. The common electrode is electrically insulated from the pair of electrodes by suitably disposed layers of dielectric spacer material. The convolutely rolled assemblage is so constructed and arranged that the common electrode lies entirely within the confines of the spacer material, whereas the pair of electrodes is wound in non-inductive (extended-foil) style with a lateral edge of one of the pair of electrodes extending from one end of the convolute roll and a lateral edge of the other of the pair extending from the opposite end of the roll. The lateral space between the pair of electrodes is substantially filled by an impregnated dielectric ribbon that extends the full length of the electrodes.

Figure 1:
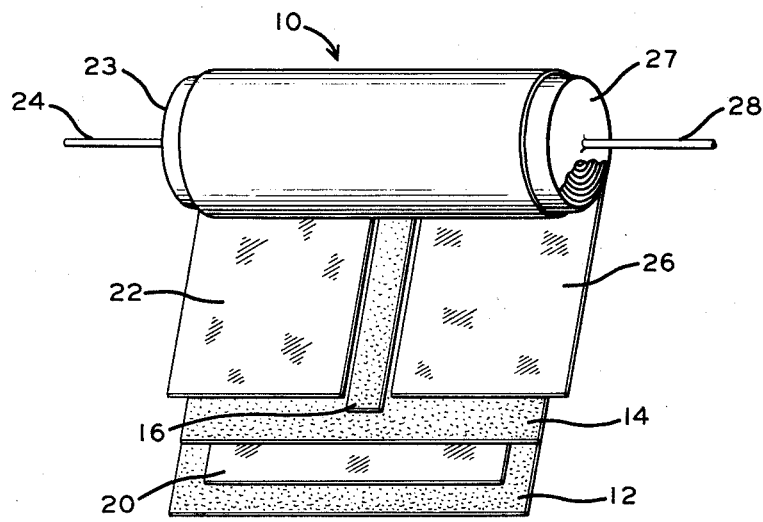
FIG. 1 is a perspective view of a partially unrolled full-wound series-wound capacitor section constructed in accordance with this invention.

FIGURE 1 shows a capacitor section 10 that is partially unrolled to reveal dielectric spacers 12 and 14 between electrode 20 and laterally spaced electrodes 22 and 26. The lateral space between juxtaposed electrodes 22 and 26 is substantially filled by dielectric ribbon 16. Laterally aligned electrodes 22 and 26 are positioned within capaictor section 10 so that their non-adjacent edges extend beyond the extremes of dielectric layers 12 and 14. The extended edges of foil 22 are provided with a solder coating 23 that is adapted to retain terminal lead 24 in electrical contact with foil 22. In a like manner, the extended turns of foil 26 are provided with a terminal lead 28 by means of solder deposit 27. Electrode 20 need not be provided with terminal means, in that it is a true common foil for both foil 22 and foil 26. The electrode 20 which is not provided with an electrical lead, since it is employed as the common electrode for the two capacitors that are formed with electrodes 22 and 26, is positioned at the center of the composite of layers, as illustrated in FIGURE 1, with its edges substantially within the boundary defined by the lateral edges of dielectric layers 12 and 14. The electrodes 22 and 26 on the other hand protrude beyond dielectric layers 12 and 14, and their lateral edges are outermost at the respective sides of capacitor section 10. Thus, electrodes 22 and 26 are rolled in an extended-foil type of capacitor construction, thereby making their respective lateral edges available for contact to appropriate lead-wires which may be positioned against the extending turns of electrodes 22 and 26 after the section has been rolled.

Figure 2:
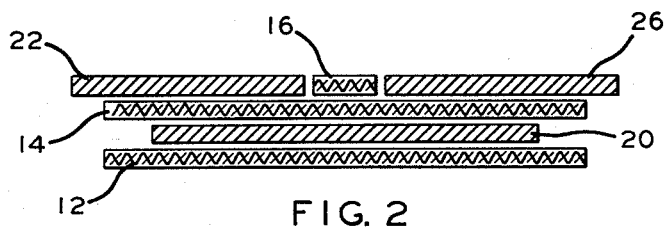
FIG. 2 is a cross-section of the capacitor shown in FIG. 1.

FIGURE 2 is a cross section taken along the unrolled portion of the capacitor shown in perspective in FIGURE 1. The various layers of section 10 are shown spaced from one another for the sake of clarity, however, it should be understood that the vertically disposed layers are brought into intimate contact in the winding of an actual section. Although it is not intended that any dimensional limitations be read into FIGURE 2, it is believed that the relative widths of the constituent layers of the capacitor section 10 can be readily observed. Thus, it is seen that dielectric layers 12 and 14 are of approximately equal width and are convolutely rolled in substantial axial alignment. It may also be seen that common electrode 20 is narrower than dielectric layers 12 and 14, and that common electrode 20 is rolled between the dielectric layers so as to be substantially centered therebetween. It is also seen that electrodes 22 and 26 are relatively narrow with respect to any other constituent layers of capacitor section 10. However, electrodes 22 and 26 are rolled so that one lateral edge of electrode 22 extends beyond an edge of dielectric layers 12 and 14, and one edge of electrode 26 extends beyond the opposite edge of dielectrics 12 and 14. FIGURE 2 also shows that dielectric ribbon 16 is of approximately the same thickness as electrodes 22 and 26 so that wrinkling and compression of the overlying dielectric layer may be avoided when the composite is tightly rolled into a convolute capacitor section.

Figure 3:
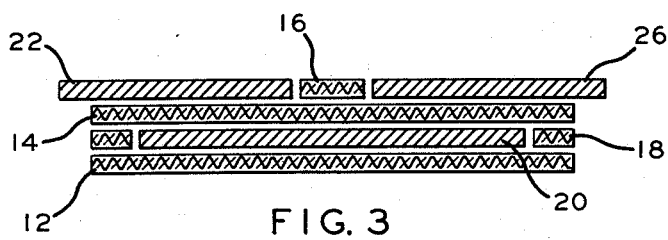
FIG. 3 is a cross-section of a modified embodiment of a capacitor constructed in accordance with this invention.

The embodiment of this invention that is illustrated in expanded cross-section in FIGURE 3 is adaptable for all widths of capacitors, but is particularly advantageous when employed in conjunction with capacitors having an extremely great overall width, e.g. six or more inches. The same reference numerals have been applied to FIG. 3 that were previously employed in explaining the invention in terms of the construction illustrated in FIGS. 1 and 2. However, this embodiment differs from the capacitor section of FIGS. 1 and 2 by the presence of additional ribbons of impregnatable dielectric material 18, which extend throughout convolute section 10 on both sides of common electrode 20. It is desirable that the composite width of common electrode 20 and the two spacer ribbons 18 be substantially equal to the width of dielectric layers 12 and 14. This equal-width feature permits the incorporation of spacer ribbons 18 into capacitor section 10 without altering the method of making contact to electrodes 22 and 26.

Although dielectric spacers 12 and 14 are shown in the drawing as comprising only a single layer of material, it should be understood that it is within the scope of this invention to have each of spacers 12 and 14 made up of two or more layers of material. Moreover, it is not necessary that the same material be used for each of the layers in either spacers 12 or 14. That is to say, a spacer may comprise one or more layers of one material in conjunction with one or more layers of some other material capable of providing a complementary function to the composite spacer. For example, one of the presently popular capacitor constructions employs a composite dielectric comprising a layer of a non-porous material sandwiched between layers of porous material. One of the preferred composite dielectrics that is suitable for use in this application is disclosed in applicant's copending application S.N. 760,112 filed September 10, 1958 (now U.S. 2,957,114 issued October 18, 1960), wherein the non-porous sheet material has a slightly greater width than the porous material in each dielectric layer.

Suitable materials for dielectric spacers 12 and 14 include any of the known capacitor dielectric materials including such porous absorptive materials as cellulosics, including both Kraft and Beneres papers, as well as the non-porous materials such as resin films, including such resins as polyethylene terephthalate, the polycarbonates, polyvinylidenechloride, polytetrafluoroethylene, and polychlorotrifluoroethylene. However, in order to ensure complete impregnation of the capacitor section 10, it is preferred that at least one layer of each of dielectric spacers 12 and 14 comprise a porous impregnatable material.

In a like manner, dielectric ribbon 16 may be of any of the above-mentioned materials, in that by substantially filling the space between the adjacent lateral edges of foils 22 and 26 the chances for voids to exist is greatly diminished. However, best practice of this invention dictates that dielectric ribbon 16 be composed of a porous absorbent material, such as Kraft paper, in that such a ribbon not only fills the space, but also acts as a wick to ensure the continued presence of the impregnating medium between the electrodes. It is not necessary that the absorptive ribbon 16 completely fill the space between electrodes 22 and 26. In fact, it is preferred that ribbon 16 not be as wide as the space between the electrodes, so as to eliminate the chance of overlap due to faulty rolling. Although it is preferred that the ribbon 16 substantially fill (two-thirds or more) the space for optimum results, it has been found that when the ribbon fills as little as one-fourth of the lateral space that the impregnant is effectively prevented from withdrawing from the space when the section cools.

Electrode foils 20, 22 and 26 may be of any of the materials that are customarily employed as electrodes in electrostatic capacitors. The preferred material for this invention is aluminum, although other materials such as copper and lead are also satisfactory. Any of the conventional capacitor solder materials, for example lead-tin solder, may be employed for solder terminals 23 and 27. In a like manner, any of the conventional lead-wire materials may be employed for lead-wires 24 and 28, with tinned copper being the preferred material.

Capacitance section 10 is impregnated with hot dielectric material in accordance with the presently best known commercial method for impregnation of capacitors. The impregnant is introduced into the section under heat and/or pressure so as to be absorbed within the section to fill all voids within the section, thereby eliminating any discontinuities that might have occurred in the dielectric medium. In this impregnation, the ribbon 16 which is preferably composed of a highly absorbent substance sops up the impregnant and cooperates in the distribution of impregnant within the capacitance section. The fact that the convolutely wound strip 16 turns on itself many times as it penetrates into the center of capacitance section 10 permits strip 16 to be used as a wick for carrying the impregnant into the inner interstices of the capacitance section.

The series-wound capacitor section shown and described herein is particularly useful in a capacitor that is to be subjected to high voltage. By virtue of the use of ribbon 16, the paired electrodes 22 and 26 may be positioned closer together than heretofore possible without creating corona. Thus, a volumetric saving is achieved in an industry that constantly seeks miniaturization. Alternatively, by maintaining a constant volume, the use of ribbon 16 will permit a higher voltage to be imposed on a capacitance section before corona starts, in that the intervening lateral space between adjacent electrodes 22 and 26 is removed as a source of corona or breakdown. The strip 16 of impregnatable material provides a path for the distribution of impregnant throughout the capacitance section so as to minimize or eliminate the danger of dielectric breakdown at any point within the section. The dielectric ribbon 16 holds the impregnant oil by capillary action, so that even when the section cools there is no withdrawal of oil from the space between the adjacent electrodes. Inasmuch as the strip 16 is preferably of a suitably absorbent material, the dielectric spacers 12 and 14 need not be entirely composed of absorbent material, but may employ one or more sheets of any non-porous material. The presence of fully impregnated ribbon 16 between electrodes 22 and 26 provides a dielectric breakdown of about 7,000 volts per mil across the space between the adjacent edges of the pair of electrodes, as compared to about 500 volts per mil for the impregnated capacitors of the prior art.

Suitable impregnants for capacitance section 10 include any of the presently conventional liquid dielectric impregnants, such as mineral oil, polyisobutylene, mineral wax, chlorinated diphenyl and chlorinated naphthalene, whether used alone or in conjunction with a stabilizer.

Another suitable group of impregnants is the in situ polymerised impregnants which are deposited in the section in liquid form and thereafter cured to effect polymerisation into a solid material, for example, n-vinyl-carbozole, pentachlorostyrene, and divinyl benzene.

The following test was conducted to establish the validity and worth of the invention herein above-described. Two sets of capacitors were rolled in the full-wound series-wound construction shown in FIGS. 1 and 2 of the drawing. Dielectric spacers 12 and 14 were each comprised of a plurality of layers of kraft paper to provide a total thickness of 5.5 mils between foils. Common electrode 20 was ⅞ inch wide ¼ mil aluminum foil, while the pair of adjacent electrodes 22 and 26 were each ½ inch wide ¼ mil aluminum foil. One of the two sets of capacitance sections was provided with ribbon 16 of ¼ inch wide ¼ mil kraft paper. The two sets of sections were then rolled and impregnated with polyisobutylene under the same conditions. Dielectric breakdown tests were conducted on both sets of capacitance sections with the result that the comparison set started to breakdown at an imposed voltage of 6,000 volts, whereas the set constructed in accordance with the teachings of this invention did not start to breakdown until 12,000 volts imposed voltage. The results of this test make apparent the advantages with respect to increased breakdown resistance and increased life that is provided by this invention.

It should be understood that although the invention has been described in terms of extended-foil capacitor construction, it is within the scope of this invention to employ the concept in a tab-wound capacitor construction, wherein foils 22 and 26 would not extend beyond dielectric layers 12 and 14, but would be provided with metallic tabs or risers that would extend beyond the ends of section 10.

It will be understood that the above-described embodiments of this invention are for purposes of illustration only, and that modifications may be made without departure from the spirit of the invention. It is intended that this invention be limited only by the scope of the appended claims.

What is claimed is:

1. A series-wound electrical capacitor section comprising an elongated common electrode convolutely wound in capacitive relation with a pair of elongated laterally spaced juxtaposed electrodes, layers of dielectric spacer material separating said common electrode from said pair of electrodes throughout the convolutely wound section, and a discrete dielectric ribbon in the space between the adjacent lateral edges of said pair of electrodes.

2. A series-wound electrical capacitor section comprising an elongated common electrode convolutely wound in capacitive relation to a pair of elongated laterally spaced juxtaposed electrodes, layers of dielectric spacer material separating said common electrode from said pair of electrodes throughout the convolutely wound section, said common electrode wound entirely within the confines of said layers, a lateral edge of one of said pair of electrodes extending from one end of said section and a lateral edge of the other of said pair of electrodes extending from the other end of said section, and a discrete absorbent dielectric ribbon substantially filling the space between the adjacent lateral edges of said pair of electrodes.

3. A capacitor section as defined in claim 2 wherein said layers and said ribbon are impregnated with a dielectric impregnant.

4. A capacitor section as defined in claim 3 wherein a discrete dielectric ribbon is rolled into the section on each side of said common electrode.

5. An electrical capacitor of convolutely wound layers comprising a close wound pair of elongated electrodes extending longitudinally side by side and convolutely wound between facing surfaces of two layers of dielectric spacer, a common electrode extending longitudinally between the outer surfaces of said dielectric spacer layers and convolutely wound so as to form a repeated pattern, adjacent lateral edges of said pair of electrodes being spaced from each other to provide an internal space, and a discrete strip of absorbent dielectric material positioned in said space between said lateral edges and convolutely wound with said layers and electrodes so as to intervene between the adjacent lateral edges of said electrodes.

6. A capacitor as claimed in claim 5, a dielectric impregnant within the convolutions of said capacitor, said dielectric impregnant being absorbed in said strip to eliminate voids in the space between said lateral edges.

References Cited in the file of this patent
UNITED STATES PATENTS

| | | |
|---|---|---|
| 1,279,941 | Thomas | Sept. 24, 1918 |
| 2,053,334 | Hetenyi | Sept. 8, 1936 |
| 2,614,524 | Haynes | Oct. 21, 1952 |
| 2,634,315 | Allison et al. | Apr. 7, 1953 |

FOREIGN PATENTS

| | | |
|---|---|---|
| 717,966 | Germany | Feb. 27, 1942 |